(12) United States Patent
Chen et al.

(10) Patent No.: US 12,272,842 B2
(45) Date of Patent: Apr. 8, 2025

(54) SAMPLING ASSEMBLY, CONNECTION ASSEMBLY, BATTERY MODULE AND VEHICLE

(71) Applicant: CONTEMPORARY AMPEREX TECHNOLOGY (HONG KONG) LIMITED, Hong Kong (CN)

(72) Inventors: Sien Chen, Ningde (CN); Shoujiang Xu, Ningde (CN); Xiaoshan Dai, Ningde (CN)

(73) Assignee: Contemporary Amperex Technology (Hong Kong) Limited, Hong Kong (CN)

( * ) Notice: Subject to any disclaimer, the term of this patent is extended or adjusted under 35 U.S.C. 154(b) by 463 days.

(21) Appl. No.: 17/546,075

(22) Filed: Dec. 9, 2021

(65) Prior Publication Data

US 2022/0102814 A1    Mar. 31, 2022

Related U.S. Application Data

(63) Continuation of application No. PCT/CN2020/102613, filed on Jul. 17, 2020.

(30) Foreign Application Priority Data

Sep. 23, 2019  (CN) .................. 201921582237.X

(51) Int. Cl.
*H01M 50/519* (2021.01)
*H01M 10/42* (2006.01)
(Continued)

(52) U.S. Cl.
CPC ....... *H01M 50/519* (2021.01); *H01M 10/425* (2013.01); *H01M 50/209* (2021.01); *H01M 50/507* (2021.01); *H01M 2220/20* (2013.01)

(58) Field of Classification Search
CPC ............. H01M 50/519; H01M 50/209; H01M 50/507; H01M 50/176; H01M 50/271;
(Continued)

(56) References Cited

U.S. PATENT DOCUMENTS

2009/0159116 A1* 6/2009 Umetani ............. H01L 31/0508
                                                    136/251
2011/0268996 A1* 11/2011 Lee ..................... H01M 10/425
                                                    429/7

(Continued)

FOREIGN PATENT DOCUMENTS

CN    208368601 U    1/2019
CN    208423224 U    1/2019
(Continued)

OTHER PUBLICATIONS

The Communication pursuant to Article 94(3) EPC for Europe an Application No. 20867622.1, dated Nov. 4, 2022, 4 pages.
(Continued)

*Primary Examiner* — Matthew W Van Oudenaren
(74) *Attorney, Agent, or Firm* — East IP P.C.

(57) ABSTRACT

The application relates to a sampling assembly, a connection assembly, a battery module and a vehicle. The sampling assembly is used for a battery module including a busbar. The sampling assembly includes: a sampling circuit board having a predetermined length and a predetermined width; a sampling leg including a first connection portion, an intermediate portion and a second connection portion, the first connection portion being connected to the sampling circuit board, the second connection portion configured to be connected to the busbar, the first connection portion including a first connection region connected to the intermediate portion, the second connection portion including a second connection region connected to the intermediate portion, at least a part of the intermediate portion having a cross-
(Continued)

sectional area which is smaller than a cross-sectional area of the first connection region and smaller than a cross-sectional area of the second connection region.

14 Claims, 11 Drawing Sheets

(51) Int. Cl.
*H01M 50/209* (2021.01)
*H01M 50/507* (2021.01)

(58) Field of Classification Search
CPC .............. H01M 50/284; H01M 50/287; H01M 50/298; H01M 50/514; H01M 50/516; H01M 50/517; H01M 50/569; H01M 50/583; H01M 50/588; H01M 10/425; H01M 10/4285; H01M 10/486; H01M 2220/20; H01M 2220/103
See application file for complete search history.

(56) References Cited

U.S. PATENT DOCUMENTS

| | | | | |
|---|---|---|---|---|
| 2012/0100761 | A1* | 4/2012 | Gro ..................... | H01M 50/528 |
| | | | | 156/50 |
| 2017/0256760 | A1* | 9/2017 | Nietling .............. | H01M 10/613 |
| 2018/0198110 | A1* | 7/2018 | Zeng ........................ | H02H 3/08 |

FOREIGN PATENT DOCUMENTS

| | | | |
|---|---|---|---|
| CN | 208873918 | * | 5/2019 |
| CN | 208873918 | U | 5/2019 |
| CN | 209249567 | U | 8/2019 |
| CN | 209249637 | U | 8/2019 |
| CN | 209249738 | U | 8/2019 |
| CN | 210142696 | U | 3/2020 |
| CN | 210467964 | U | 5/2020 |
| CN | 210467965 | U | 5/2020 |
| JP | 2015138604 | A | 7/2015 |
| JP | 2019036386 | A | 3/2019 |
| WO | 9624943 | A1 | 8/1996 |

OTHER PUBLICATIONS

The International search report for PCT Application No. PCT/CN2020/102613, dated Oct. 19, 2020, 13 pages.
The extended European search report for European Application No. 20867622.1, dated May 31, 2022, 6 pages.

* cited by examiner

SAMPLING ASSEMBLY, CONNECTION ASSEMBLY, BATTERY MODULE AND VEHICLE

CROSS REFERENCE TO RELATED APPLICATION

This application is a continuation of International Application No. PCT/CN2020/102613 filed on Jul. 17, 2020, which claims the priority benefits of Chinese Patent Application No. 201921582237.X filed on Sep. 23, 2019 both of which are incorporated herein by reference in their entireties.

TECHNICAL FIELD

The application relates to the field of battery technology, and in particular to a sampling assembly, a connection assembly, a battery module and a vehicle.

BACKGROUND

A battery module includes a plurality of secondary batteries arranged side by side. It is necessary to collect the voltage of each secondary battery included in the battery module in use. At present, a circuit board assembly is usually used to perform the pressure collection, and therefore the reliability of the secondary battery voltage collection depends on that of the circuit board assembly. The circuit board assembly is connected, through a connection sheet, such as a nickel sheet, to a busbar connected with the secondary batteries. However, a secondary battery may expand in use, and then there is a possibility for the circuit board assembly and the busbar jointly stretch the connection sheet to cause the connection sheet to be broken, thereby making it impossible for the circuit board assembly to perform collection normally.

SUMMARY

Embodiments of the application provide a sampling assembly, a connection assembly, a battery module and a vehicle. The sampling assembly can reduce the possibility of breaking of a sampling leg bearing a tensile force and improve its operational reliability.

In one aspect, an embodiment of the application provides a sampling assembly for a battery module. The battery module includes a busbar. The sampling assembly includes a sampling circuit board and a sampling leg. The sampling circuit board has a predetermined length and a predetermined height. The sampling leg includes a first connection portion, an intermediate portion and a second connection portion. The first connection portion is connected to the sampling circuit board. The second connection portion is used to be connected to the busbar. The first connection portion includes a first connection region connected to the intermediate portion. The second connection portion includes a second connection region connected to the intermediate portion. At least a part of the intermediate portion has a cross-sectional area which is smaller than a cross-sectional area of the first connection region and smaller than a cross-sectional area of the second connection region.

According to one aspect of the application, the intermediate portion is provided with a through hole, a cross-sectional area of a portion of the intermediate portion corresponding to the through hole being smaller than the cross-sectional area of the first connection region and smaller than the cross-sectional area of the second connection region.

According to one aspect of the application, there is provided with two or more through holes spaced apart in a width direction of the sampling circuit board.

According to one aspect of the application, the first connection portion, the intermediate portion and the second connection portion are successively distributed in the width direction of the sampling circuit board, the number of the through hole is one in order to form two strip-like bodies separated at the intermediate portion; or two or more through holes are distributed spaced apart in a length direction of the sampling circuit board, in order to form a plurality of strip-like bodies separated at the intermediate portion.

According to one aspect of the application, each of the strip-like bodies has an identical cross-sectional area.

According to one aspect of the application, the through hole penetrates through the intermediate portion in the width direction, and the through hole extends from the first connection region to the second connection region.

According to one aspect of the application, the intermediate portion comprises a bent pointed region protruding in a length direction of the sampling circuit board, a starting point and/or an end point of the through hole being offset from the bent pointed region in a width direction of the sampling circuit board.

According to one aspect of the application, a size of the intermediate portion is smaller than a size of the first connection region and smaller than a size of the second connection region in a length direction of the sampling circuit board.

According to one aspect of the application, the first connection portion and the second connection portion are aligned in a length direction of the sampling circuit board; or the first connection portion and the second connection portion are offset from each other in the length direction of the sampling circuit board.

According to one aspect of the application, at least a part of the intermediate portion protrudes from the first connection portion and the second connection portion in a length direction of the sampling circuit board.

According to one aspect of the application, the intermediate portion comprises at least two connection sections successively distributed, the at least two connection sections are configured as a wave-shaped structure.

According to one aspect of the application, all of the connection sections are straight sections or arc sections, or one part of the at least two connection sections is a straight section, and the other part is an arc section.

According to one aspect of the application, the sampling leg is a sheet-like structure, a thickness of the first connection portion, a thickness of the intermediate portion, and a thickness of the second connection portion being equal.

According to one aspect of the application, the sampling circuit board includes a substrate, a sampling line and a protective film, the sampling line being laid on the substrate, the first connection portion of the sampling leg being connected to the sampling line, and at least a part of the first connection portion being covered by the protective film.

Regarding the sampling leg according to an embodiment of the application, when the relative position between the first connection portion and the second connection portion is changed, the sampling leg itself will bear a tensile force. Since the intermediate portion of the sampling leg has deformability and cushioning ability, the intermediate portion can cushion the tensile force described above, thereby reducing a tensile stress borne by a junction between the intermediate portion and the first connection region and a junction between the intermediate portion and the second connection region and reducing the possibility of breakage of the intermediate portion and the first connection region and/or the intermediate portion and the second connection region, which is advantageous to increase the operational reliability and stability of the sampling assembly and ensure that the sampling assembly performs collection normally.

In still another aspect, an embodiment of the application provides a connection assembly for a battery module. The connection assembly includes:

a busbar, an insulator and the sampling assembly according to the above embodiments. The busbar and the sampling assembly are connected fixedly by the insulator. The sampling leg extends from the sampling circuit board toward the busbar and is connected to the busbar.

In another aspect, an embodiment of the application provides a battery module including secondary batteries, a busbar and the sampling assembly according to the above embodiments. Two or more secondary batteries are arranged side by side in an arrangement direction. A busbar is arranged on a top of the secondary batteries and electrically connected to at least two of the secondary batteries. The sampling circuit board extends in the arrangement direction and has a stripe-like structure. The sampling leg extends from the sampling circuit board toward the busbar and the second connection portion is connected to the busbar.

According to another aspect of the application, the secondary battery includes an electrode assembly including wide sides and narrow sides which are alternately distributed, the wide sides intersecting with the arrangement direction.

In yet another aspect, an embodiment of the application provides a vehicle including a power source and a battery module according to the above embodiments. The power source is used to provide driving force to the vehicle. The battery module according to the above embodiments is configured to supply electric energy to the power source.

BRIEF DESCRIPTION OF THE DRAWINGS

The features, advantages and technical effects of the exemplary embodiments of the application will be described below with reference to the drawings.

Figure 1:
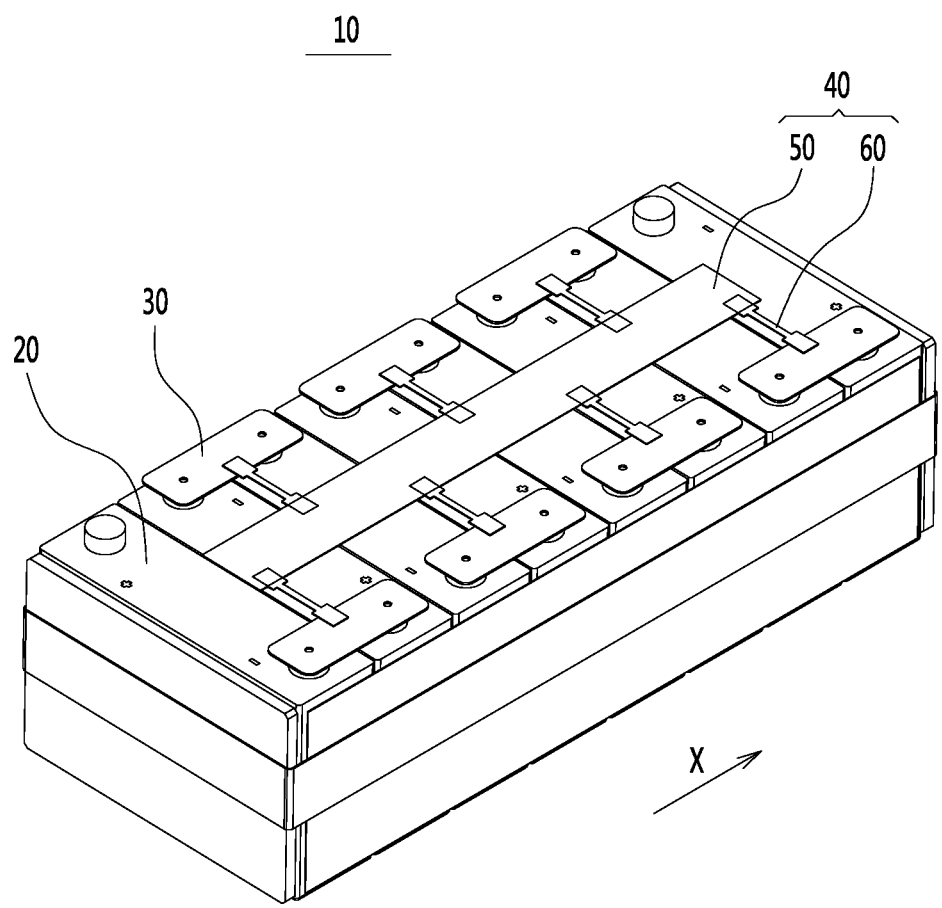
FIG. 1 is a schematic structural view of a battery module according to an embodiment of the application.

The drawings are not necessarily plotted in actual proportion in the drawings.

LIST OF REFERENCES 10 battery module; 20 secondary battery; 21 electrode assembly; 21a wide side; 21b narrow side; 30 busbar; 40 sampling assembly; 50 sampling circuit board; 60 sampling leg; 61 first connection portion; 61a first connection region; 62 intermediate portion; 62a bar; 621 straight section; 621a bent pointed region; 622 arc section; 63 second connection portion; 63a second connection region; 64 through hole; 70 connection assembly; 80 insulators; X arrangement direction.

DETAILED DESCRIPTION

The implementation of the application will be further described in detail below in combination with the drawings and embodiments. The following detailed description of the embodiments and drawings is used to exemplarily explain the principle of the application, rather than limiting the scope of the application, that is, the application is not limited to the described embodiments.

In the description of the application, it is noted that, except as otherwise noted, the term "a plurality of" means two or more; the orientation or position relationship indicated by the terms "above", "below", "left", "right", "in", "out" is only for the purpose of describing the application conveniently and briefly, rather than indicating or implying that the noted unit or element is necessarily of the specific orientation or structured or operated in the specific orientation, thus, cannot be regarded as limit of the application. In addition, the terms such as "first", "second" and the like are only for the purpose of description, and shall not be deemed to indicate or imply relative importance.

In the description of the application, it is also noted that, except as otherwise stipulated or limited explicitly, the terms "mount", "link", "connect" shall be interpreted expansively, for example, it may be fixed connection, removable connection or integral connection; may be direct connection or indirect connection via an intermediate medium. For a person of ordinary skill in the art, the specific meaning of the above terms in the application can be interpreted depending on the specific situation.

For better understanding of the application, embodiments of the application will be described below in detail in combination with FIGS. 1 to 32.

Figure 2:
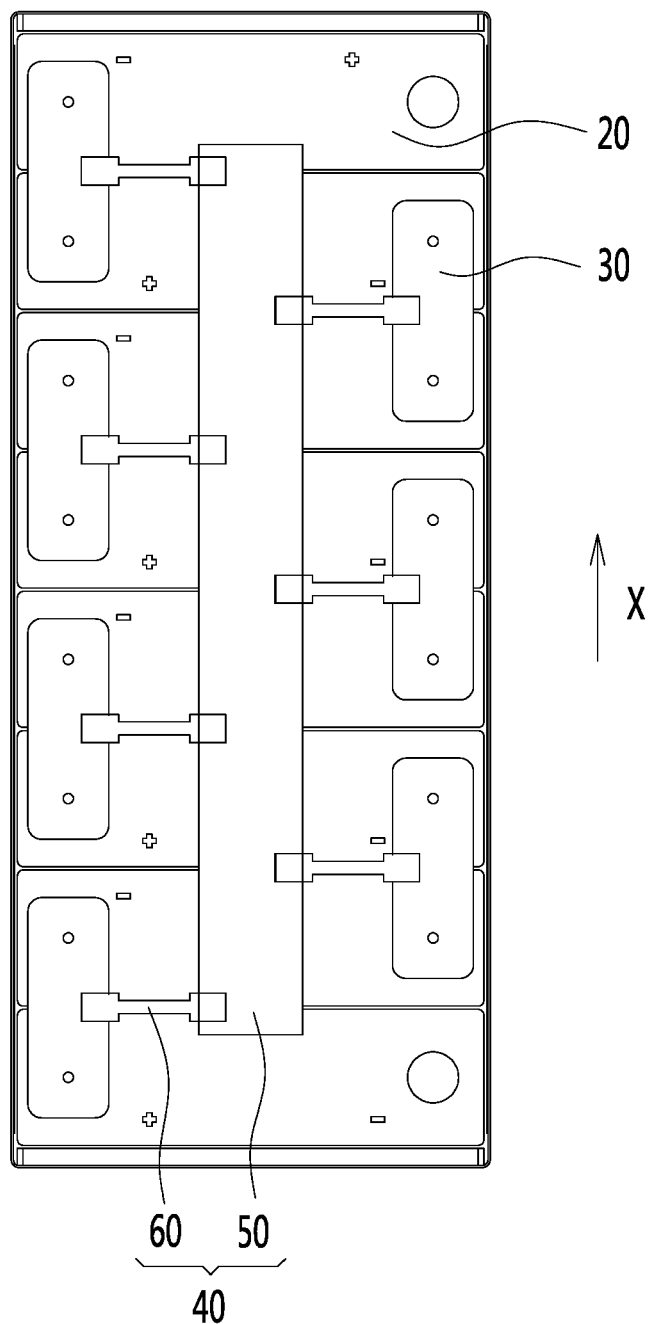
FIG. 2 is a structural top view of the battery module according to the embodiment shown in FIG. 1.
Figure 3:
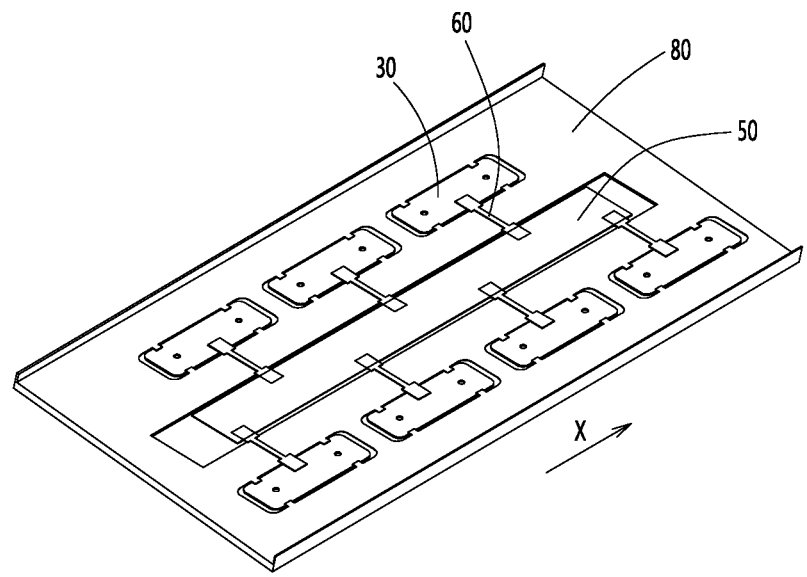
FIG. 3 is a schematic structural view of a connection assembly according to an embodiment of the application.

As shown in FIGS. 1 to 3, a battery module 10 according to an embodiment of the application includes secondary batteries 20 and a connection assembly 70 connected to the secondary batteries 20. The connection assembly 70 includes a busbar 30, an insulator 80, and a sampling assembly 40. The sampling assembly 40 includes a sampling circuit board 50 and a sampling leg 60. The busbar 30 and the sampling assembly 40 are connected fixedly by the insulator 80. In an example, the connection assembly 70 further includes a snap-in member or an adhesive member. The sampling assembly 40 and the insulator 80 are connected fixedly by the snap-in member or the adhesive member. In another example, the insulator 80 is a sheet-like structure, and the sampling circuit board 60 and the insulator 80 are connected fixedly by thermocompression. Optionally, the insulator 80 is a harness separation board. Two or more secondary batteries 20 are arranged side by side in an arrangement direction X. The arrangement direction X is the same as a width direction of the secondary battery 20. Each busbar 30 is arranged on the top of the secondary batteries 20, and are electrically connected to at least two secondary batteries 20, so that a plurality of secondary batteries 20 connected by one busbar 30 are connected to each other in series or in parallel.

The sampling circuit board 50 is a strip-like structure with a predetermined length and a predetermined width. The sampling circuit board 50 is arranged on the top of the secondary batteries 20. A length direction of the sampling circuit board 50 is the same as the arrangement direction X. The sampling leg 60 extends in a width direction of the sampling circuit board 50. The width direction of the sampling circuit board 50 intersects with the arrangement direction X. The sampling leg 60 includes a first connection portion 61, an intermediate portion 62 and a second connection portion 63. The first connection portion 61 is connected to the sampling circuit board 50, and the second connection portion 63 is connected to the busbar 30. Optionally, the first connection portion 61 is welded to the sampling circuit board 50, and the second connection portion 63 is welded to the busbar 30. The first connection portion 61 includes a first connection region 61a connected to the intermediate portion 62. The second connection portion 63 includes a second connection region 63a connected to the intermediate portion 62. At least a part of the intermediate portion 62 has a cross-sectional area which is smaller than that of the first connection region 61a and smaller than that of the second connection region 63a. Thus, an overall rigidity of the intermediate portion 62 may be smaller than those of the first connection region 61a and the second connection region 63a, so that the intermediate portion 62 has relatively good deformability and cushioning ability as a whole.

Regarding the sampling leg 60 according to an embodiment of the application, when the relative position between the first connection portion 61 and the second connection portion 63 is changed, the sampling leg 60 itself will bear a tensile force. Since the intermediate portion 62 of the sampling leg 60 has deformability and cushioning ability, the intermediate portion 62 can cushion the tensile force described above, thereby reducing a tensile stress borne by a junction between the intermediate portion 62 and the first connection region 61a and a junction between the intermediate portion 62 and the second connection region 63a and reducing the possibility of breakage of the intermediate portion 62 and the first connection region 61a and/or the intermediate portion 62 and the second connection region 63a, which is advantageous to increase the operational reliability and stability of the sampling assembly 40 and ensure that the sampling assembly 40 performs collection normally. The connection assembly 70 including the sampling assembly 40 of the embodiment of the application may be applied to the battery module 10. During use of the battery module 10 of the embodiment of the application, the secondary batteries 20 may undergo expansive deformation or vibration deformation, thereby causing a positional change of the secondary batteries 20. As a result, the secondary batteries 20 may drive the sampling circuit board 50 to move, so that the busbar 30 and the sampling board 50 jointly apply a tensile force to the sampling leg 60. The intermediate portion 62 can cushion the tensile force, reducing the possibility of failure of the collection function due to breakage of the intermediate portion 62 and the first connection region 61a and/or the intermediate portion 62 and the second connection region 63a, which is advantageous to improve use safety of the battery module 10.

Figure 4:
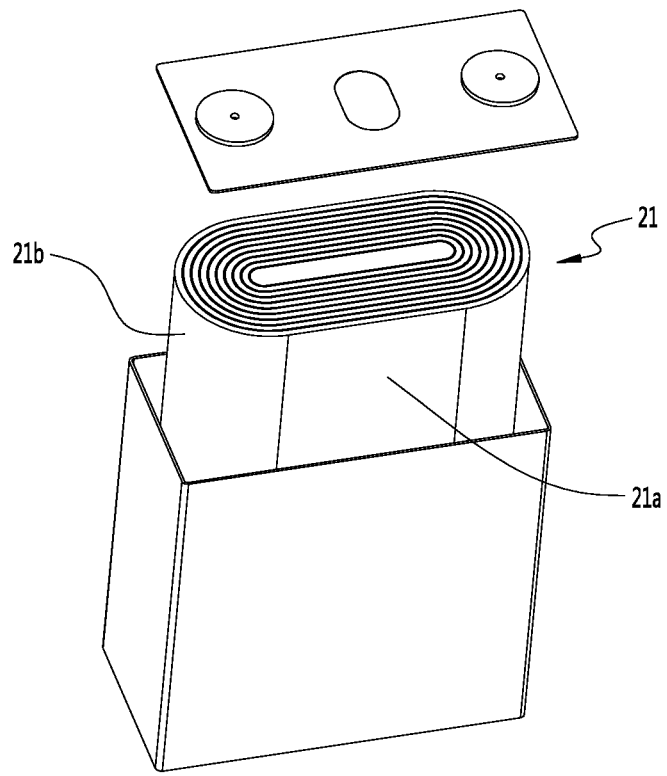
FIG. 4 is an exploded structural view of a secondary battery according to an embodiment of the application.

As shown in FIG. 4, each secondary battery 20 includes a housing and an electrode assembly 21 disposed in the housing. The electrode assembly 21 includes wide sides 21a and narrow sides 21b which are alternately distributed, in which the wide sides 21a intersect with the arrangement direction X. During use of the secondary battery 20, the electrode assembly 21 expands, thereby causing the housing to expand, so that a position of the entire secondary battery 20 in the arrangement direction X is changed. Since the wide sides 21a of the electrode assembly 21 have a greater degree of expansion than that of the narrow sides 21b, a deformation amount of expansion of the electrode assembly 21 is larger in the arrangement direction X, so that the busbar 30 and the sampling circuit board 50 jointly apply a larger tensile force to the sampling leg 60.

Figure 5:
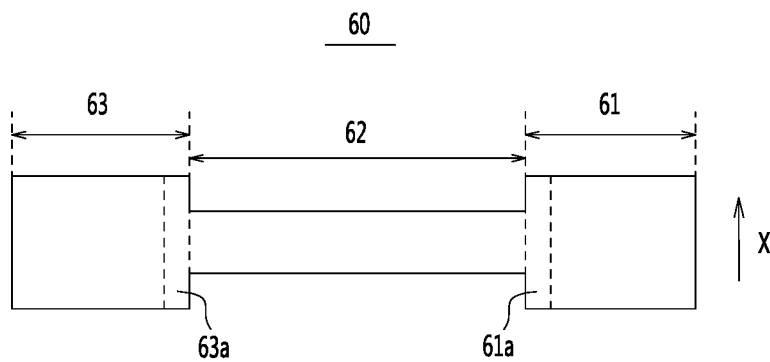
FIG. 5 is a schematic structural view of a sampling leg according to an embodiment of the application.

In an embodiment, as shown in FIG. 5, the first connection portion 61 and the second connection portion 63 are aligned in the arrangement direction X. The intermediate portion 62 has a size smaller than that of the first connection region 61a and smaller than that of the second connection region 63a in the arrangement direction X, so that the cross-sectional area of the entire intermediate portion 62 is smaller than that of the first connection region 61a and smaller than that of the second connection region 63a. In the embodiment, the first connection portion 61 and the second connection portion 63 have a rectangular structure respectively in general. The first connection region 61a and the second connection region 63a have a rectangular structure continuously extending in the arrangement direction X respectively. The intermediate portion 62 extends straightly between the first connection region 61a and the second connection region 63a. The intermediate portion 62 is connected to a middle region of the first connection region 61a and a middle region of the second connection region 63a in the arrangement direction X. When the secondary battery 20 is deformed, a relative position between the first connection region 61a and the second connection region 63a is changed in the arrangement direction X. Since the intermediate portion 62 has relatively small rigidity, the intermediate portion 62 itself may be deformed to cushion a tensile force borne by itself, thereby reducing a tensile stress borne by the junction between the intermediate portion 62 and the first connection region 61a and the junction between the intermediate portion 62 and the second connection region 63a and reducing the possibility of breakage of the intermediate portion 62 and the first connection region 61a and/or the intermediate portion 62 and the second connection region 63a. In an example, the sampling leg 60 is a sheet-like structure. A thickness of the first connection portion 61, a thickness of the intermediate portion 62, and a thickness of the second connection portion 63 are equal. In an example, the sampling circuit board 50 includes a substrate, a sampling line, and a protective film. The sampling line is laid on the substrate, and a protective film covers the sampling line to protect it. The protective film covers the entire substrate. The protective film is an insulating structural member. The first connection portion 61 of the sampling leg 60 is connected to the sampling line, and at least a part of the first connection portion 61 is covered by the protective film. Optionally, the first connection portion 61, the intermediate portion 62, and the second connection portion 63 of the sampling leg 60 are integrally formed.

Figure 6:
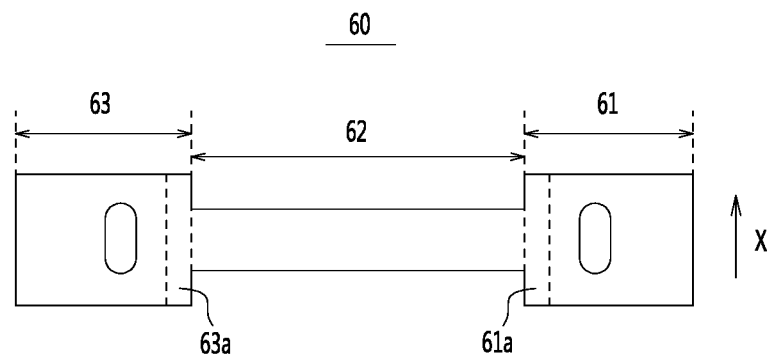
FIG. 6 is a schematic structural view of a sampling leg according to still another embodiment of the application.
Figure 7:
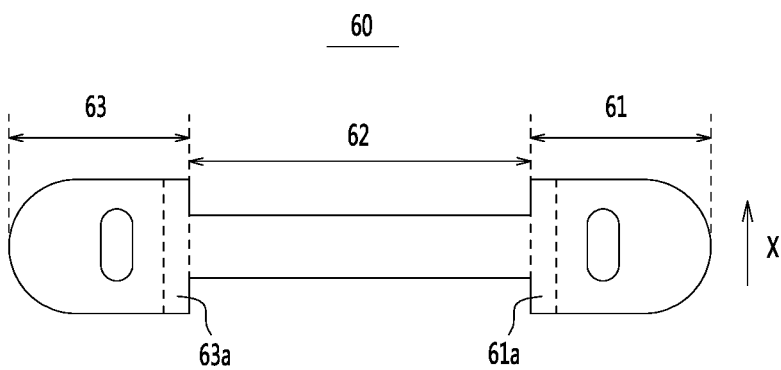
FIG. 7 is a schematic structural view of a sampling leg according to still another embodiment of the application.

In an embodiment, both FIGS. 6 and 7 may be seen as a variation of the embodiment shown in FIG. 5, and therefore, the same portion as those shown in FIG. 5 will not be described again below, which can be understood with reference to the foregoing description of the embodiment shown in FIG. 5, and only the differences between the embodiments will be described in the following. In the embodiment, as shown in FIG. 6, each of the first connection portion 61 and the second connection portion 63 is provided with a through hole. In the process of connecting the first connection portion 61 with the sampling circuit board 50 and connecting the second connection portion 63 with the busbar 30, the connection state can be observed through the through holes. In the embodiment, the through hole of the first connection portion 61 is spaced apart from the first connection region 61a. The through hole of the second connection portion 63 is spaced apart from the second connection region 63a. The first connection region 61a and the second connection region 63a are each located between the corresponding through hole and the intermediate portion 62. In an example, as shown in FIG. 7, an edge of the first connection portion 61 away from the second connection portion 63 is circular arc-shaped, and an edge of the second connection portion 63 away from the first connection portion 61 is circular arc-shaped.

Figure 8:
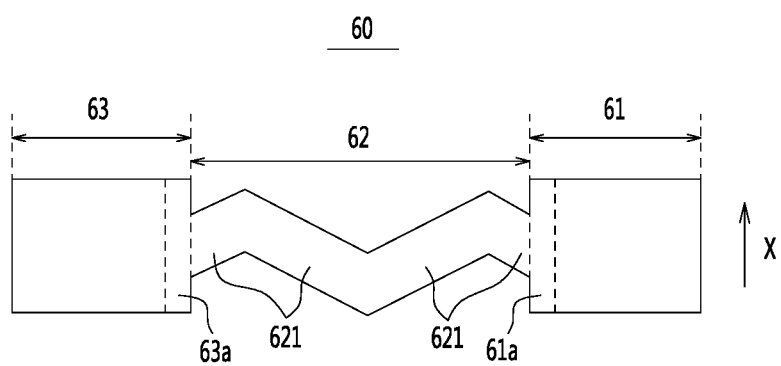
FIG. 8 is a schematic structural view of a sampling leg according to still another embodiment of the application.
Figure 9:
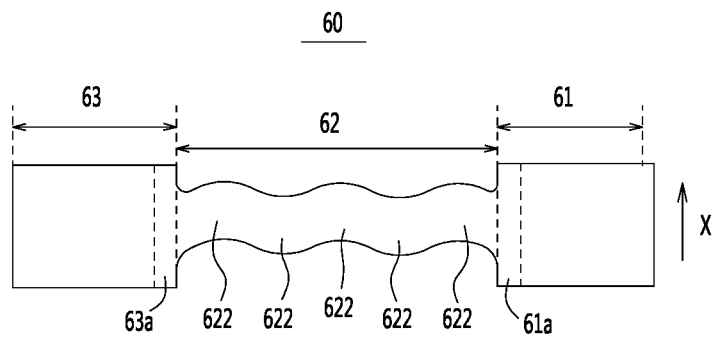
FIG. 9 is a schematic structural view of a sampling leg according to still another embodiment of the application.

In an embodiment, both FIGS. 8 and 9 may be seen as a variation of the embodiment shown in FIG. 5, and therefore, the same portion as those shown in FIG. 5 will not be described again below, which can be understood with reference to the foregoing description of the embodiment shown in FIG. 5, and only the differences between the embodiments will be described in the following. In the embodiment, the intermediate portion 62 includes at least two connection sections successively distributed. The at least two connection sections successively distributed are configured as a wave-shaped structure, which is advantageous to further increase deformability and cushioning ability of the intermediate portion 62. In an example, as shown in FIG. 8, all of the connection sections are straight sections 621. Two adjacent straight sections 621 are intersected. Optionally, an angle between two adjacent straight sections 621 may range from 100 degrees to 160 degrees. In some embodiments, the angle between two adjacent straight sections 621 is 135 degrees. In another example, as shown in FIG. 9, all of the connection sections are arc-shaped sections 622. There is a smooth transition between two adjacent arc-shaped sections 622, which is advantageous to reduce stress concentration points. In some embodiments, the arc-shaped sections 622 may be circular arc-shaped sections. In another example, one part of the at least two connection sections is a straight section 621 and the other part is an arc-shaped section 622. For example, there is provided with six connection sections, three of which are straight sections 621 and the remaining three are arc-shaped sections 622. There is a smooth transition between the straight section 621 and arc-shaped section 622.

Figure 10:
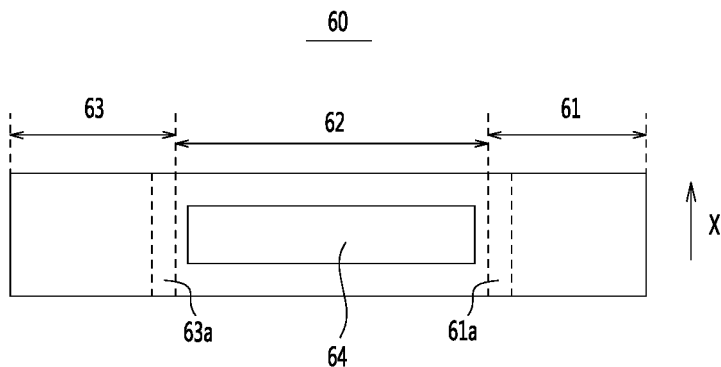
FIG. 10 is a schematic structural view of a sampling leg according to still another embodiment of the application.
Figure 11:
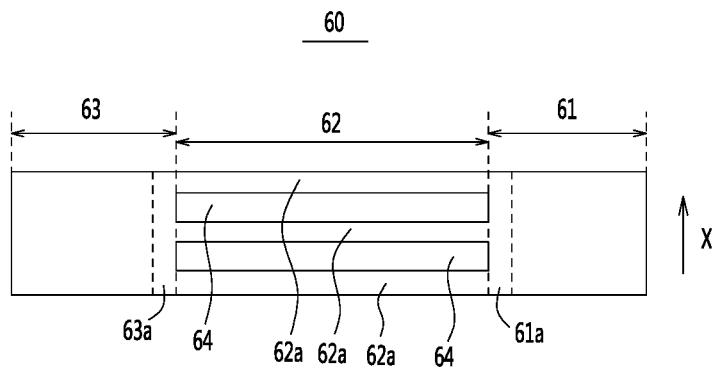
FIG. 11 is a schematic structural view of a sampling leg according to still another embodiment of the application.

In an embodiment, both FIGS. 10 and 11 may be seen as a variation of the embodiment shown in FIG. 5, and therefore, the same portion as those shown in FIG. 5 will not be described again below, which can be understood with reference to the foregoing description of the embodiment shown in FIG. 5, and only the differences between the embodiments will be described in the following. As shown FIG. 10, the overall size of the intermediate portion 62 is equal to that of the first connection region 61a and equal to the second connection region 63a in the arrangement direction X. The sampling leg 60 has a through hole 64. The intermediate portion 62 is provided with the through hole 64. A cross-sectional area of a portion of the intermediate portion 62 corresponding to the through hole 64 is smaller than that of the first connection region 61a and smaller than that of the second connection region 63a, which is advantageous to reduce overall rigidity of the intermediate portion 62 and improve deformability and cushioning ability of the intermediate portion 62. In the embodiment, there is provided with one through hole 64. The through hole 64 extends between the first connection region 61a and the second connection region 63a. The starting point of the through hole 64 is close to the first connection region 61a and has a predetermined distance from the first connection region 61a, and the end point is close to the second connection region 63a and has a predetermined distance from the second connection region 63a. Optionally, the starting point of the through hole 64 coincides with an edge of the first connection region 61a close to the second connection region 63a, and the end point coincides with an edge of the second connection region 63a close to the first connection region 61a. In an example, an edge of the first connection region 61a close to the second connection region 63a coincides with an edge of the protective film or is located on a side of the protective film close to the busbar 30, and an edge of the second connection region 63a close to the first connection region 61a coincides with an edge of the busbar 30 or is located on the side of the busbar 30 close to the protective film. In an example, as shown in FIG. 10, the through hole 64 separates the intermediate portion 62 to form two strip-like bodies 62a. The two strip-like bodies 62a are spaced apart in the arrangement direction X, and the two strip-like bodies 62a have equal sizes in the arrange direction X and equal cross-sectional areas respectively. The two strip-like bodies 62a may be of redundant design. When one of the strip-like bodies 62a is broken by a tensile force, the other of the strip-like bodies 62a can still ensure that the first connection portion 61 and the second connection portion 63 are maintained in a communication state, thereby improving connection reliability of the sampling leg 60. At the same time, since the cross-sectional areas of the respective strip-like bodies 62a are equal, the flow area of each strip-like body 62a is the same, which is advantageous to improve sampling consistency between the strip-like bodies 62a. In another example, as shown in FIG. 11, two through holes 64 are spaced apart in the arrangement direction X to form three strip-like bodies 62a at the intermediate portion 62. The three strip-like bodies 62a have equal sizes in the arrange direction X and equal cross-sectional areas respectively. The through holes 64 penetrate through the intermediate portion 62 in an extension direction of the intermediate portion 62. The through holes 64 extend starting from the first connection region 61a to the second connection region 63a, so that the respective starting points of the two through holes 64 coincide with the edge of the first connection region 61a close to the second connection region 63a, and the end points coincide with the edge of the second connection region 63a close to the first connection region 61a. It is easily understood that the amount of the through holes 64 is not limited to one or two as described above. The amount of the through holes 64 may be three or more according to the product demand in order to form four or more strip-like bodies 62a at the intermediate portion 62. The amount of the strip-like bodies 62a is one more than the amount of the through holes 64.

Figure 12:
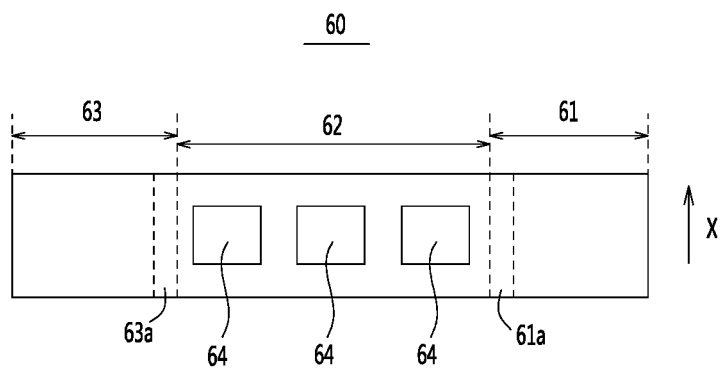
FIG. 12 is a schematic structural view of a sampling leg according to still another embodiment of the application.

In an embodiment, FIG. 12 may be seen as a variation of the embodiment shown in FIG. 10, and therefore, the same portion as those shown in FIG. 10 will not be described again below, which can be understood with reference to the foregoing description of the embodiment shown in FIG. 10, and only the differences between the embodiments will be described in the following. As shown in FIG. 12, there is provided with three through holes 64 in the embodiment. The three through holes 64 are spaced apart in a direction from the first connection portion 61 to the second connection portion 63. A direction from the first connection portion 61 to the second connection portion 63 intersects with the arrangement direction X. In some embodiments, the three through holes 64 are the same in size and shape, and are evenly distributed at equal intervals between the first connection region 61a and the second connection region 63a. It is easily understood that the amount of the through holes 64 is not limited to three as described above. The amount of the through holes 64 may be two, four or more according to the product demand.

Figure 13:
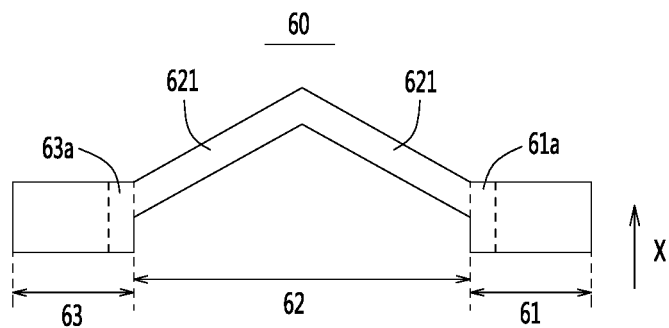
FIG. 13 is a schematic structural view of a sampling leg according to still another embodiment of the application.
Figure 14:
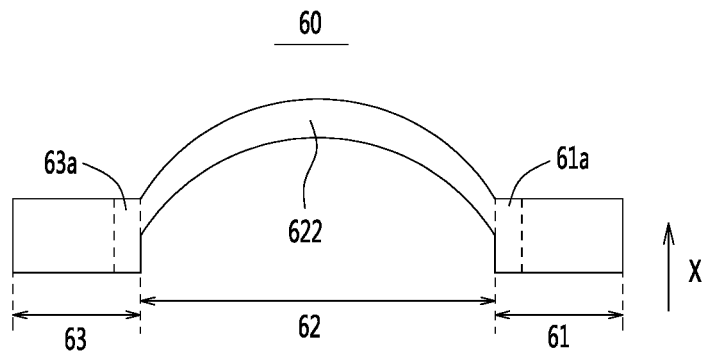
FIG. 14 is a schematic structural view of a sampling leg according to still another embodiment of the application.
Figure 15:
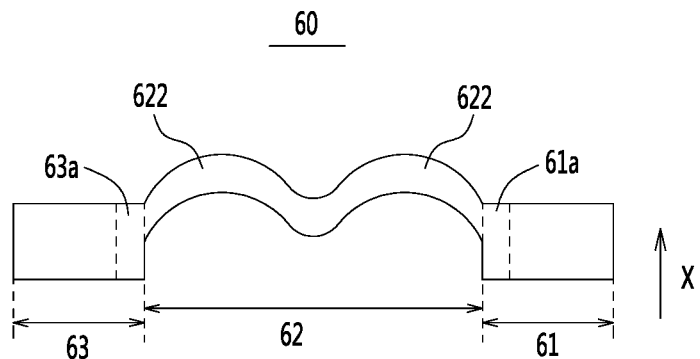
FIG. 15 is a schematic structural view of a sampling leg according to still another embodiment of the application.

In an embodiment, each of FIGS. 13 to 15 may be seen as a variation of the embodiment shown in FIG. 5, and therefore, the same portion as those shown in FIG. 5 will not be described again below, which can be understood with reference to the foregoing description of the embodiment shown in FIG. 5, and only the differences between the embodiments will be described in the following. As shown in FIG. 13, at least a part of the intermediate portion 62 protrudes beyond the first connection portion 61 and the second connection portion 63 in the arrangement direction X. The intermediate portion 62 has a size smaller than that of the first connection region 61a and smaller than that of the second connection region 63a in the arrangement direction X, so that the cross-sectional area of the entire intermediate portion 62 is smaller than that of the first connection region 61a and smaller than that of the second connection region 63a. In an example, the intermediate portion 62 includes two connection sections successively distributed. The two connection sections successively distributed are configured as a wave-shaped structure. As shown in FIG. 13, the two connection sections are both straight sections 621. Optionally, an angle between two adjacent straight sections 621 may range from 100 degrees to 160 degrees. In some embodiments, the angle between two adjacent straight sections 621 is 135 degrees. In another example, as shown in FIG. 14, the entire intermediate portion 62 includes an arc-shaped section 622. In another example, as shown in FIG. 15, the intermediate portion 62 includes two connection sections. The connection sections are both arc-shaped sections 622. There is a smooth transition between two adjacent arc-shaped sections 622. In another example, a part of the two connection sections is a straight section 621 and the other part is an arc-shaped section 622. There is a smooth transition between the straight section 621 and arc-shaped section 622. It is easily understood that the amount of the connection sections is not limited to two, and may also be three or more.

Figure 16:
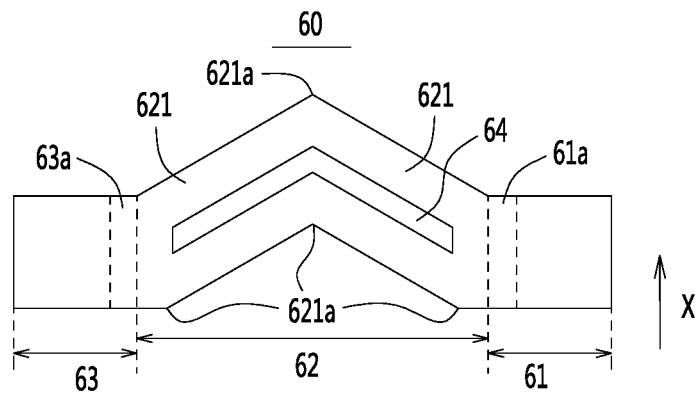
FIG. 16 is a schematic structural view of a sampling leg according to still another embodiment of the application.
Figure 17:
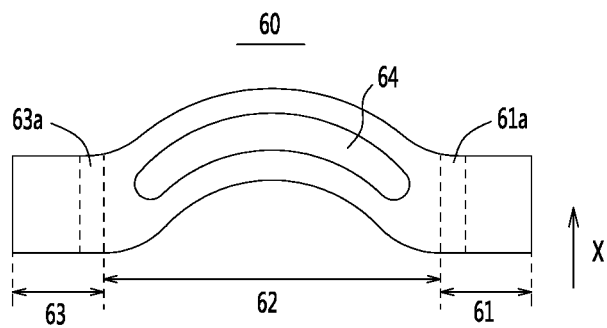
FIG. 17 is a schematic structural view of a sampling leg according to still another embodiment of the application.
Figure 18:
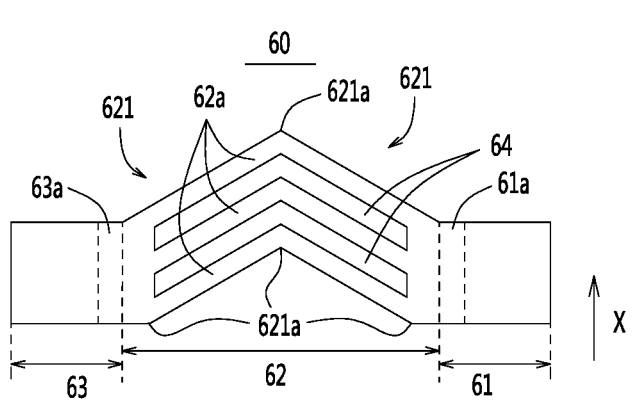
FIG. 18 is a schematic structural view of a sampling leg according to still another embodiment of the application.
Figure 19:
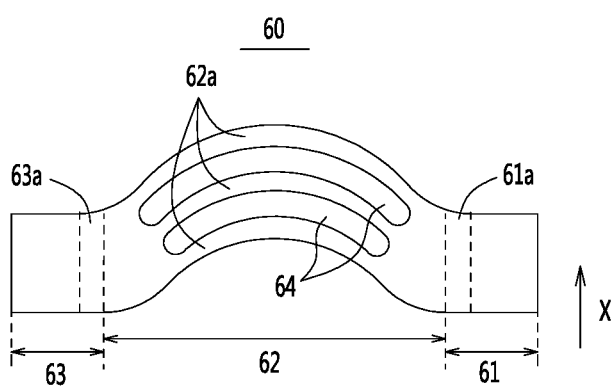
FIG. 19 is a schematic structural view of a sampling leg according to still another embodiment of the application.

In an embodiment, each of FIGS. 16 to 19 may be seen as a variation of the embodiment shown in FIG. 13, and therefore, the same portion as those shown in FIG. 13 will not be described again below, which can be understood with reference to the foregoing description of the embodiment shown in FIG. 13, and only the differences between the embodiments will be described in the following. As shown in FIG. 16, the sampling leg 60 includes a through hole 64. The intermediate portion 62 is provided with the through hole 64. A cross-sectional area of a portion of the intermediate portion 62 corresponding to the through hole 64 is smaller than that of the first connection region 61a and smaller than that of the second connection region 63a, which is advantageous to reduce overall rigidity of the intermediate portion 62. In the embodiment, there is provided with one through hole 64. The through hole 64 extends between the first connection region 61a and the second connection region 63a. The starting point of the through hole 64 is close to the first connection region 61a and has a predetermined distance from the first connection region 61a, and the end point is close to the second connection region 63a and has a predetermined distance from the second connection region 63a. Optionally, the starting point of the through hole 64 coincides with an edge of the first connection region 61a close to the second connection region 63a, and the end point coincides with an edge of the second connection region 63a close to the first connection region 61a. The through hole 64 separates the intermediate portion 62 to form two strip-like bodies 62a. The two strip-like bodies 62a are spaced apart in the arrangement direction X. The two strip-like bodies 62a may be of redundant design. When one of the strip-like bodies 62a is broken by a tensile force, the other of the strip-like bodies 62a can still ensure that the first connection portion 61 and the second connection portion 63 are maintained in a communication state, thereby improving connection reliability of the sampling leg 60. In the embodiment, the intermediate portion 62 includes two straight sections 621. The through hole 64 extends continuously over the two straight sections 621. The intermediate portion 62 includes a bent pointed region 621a protruding in the arrangement direction X. The starting point and/or the end point of the through hole 64 is offset from the bent pointed region 621a in the direction from the first connection portion 61 to the second connection portion 63, so as to avoid the bent pointed region 621a and reduce the possibility that the intermediate portion 62 is easily broken at the bent pointed region 621a due to a stress concentrated in the bent pointed region 621a. Optionally, the amount of the straight sections 621 is not limited to two, and may be three or more. In an example, as shown in FIG. 17, the entire intermediate portion 62 includes one arc-shaped section 622. The through hole 64 extends in the extension direction of the intermediate portion 62 so as to be substantially the same as the contour of the intermediate portion 62. In another example, as shown in FIGS. 18 and 19, the intermediate portion 62 includes two through holes 64. The two through holes 64 are spaced apart in the arrangement direction X to form three strip-like bodies 62a in the intermediate portion 62. The three strip-like bodies 62a may be of redundant design. It is easily understood that the amount of the through holes 64 is not limited to two as described above. The amount of the through holes 64 may be three or more according to the product demand in order to form four or more strip-like bodies 62a at the intermediate portion 62. As shown in FIG. 18, the intermediate portion 62 includes two straight sections 621. As shown in FIG. 19, the entire intermediate portion 62 may be an arc-shaped section 622. Optionally, the intermediate portion 62 may also include two interconnected arc-shaped sections 622.

Figure 20:
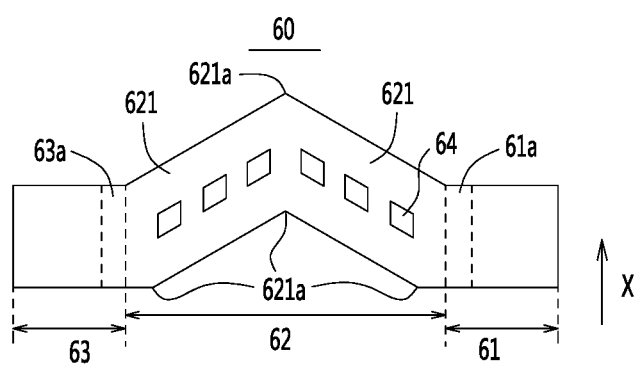
FIG. 20 is a schematic structural view of a sampling leg according to still another embodiment of the application.
Figure 21:
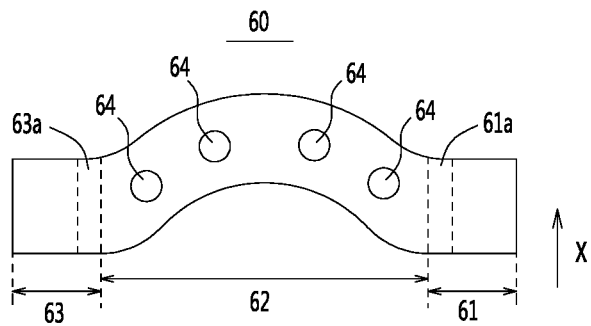
FIG. 21 is a schematic structural view of a sampling leg according to still another embodiment of the application.

In an embodiment, both FIGS. 20 and 21 may be seen as a variation of the embodiment shown in FIG. 16, and therefore, the same portion as those shown in FIG. 16 will not be described again below, which can be understood with reference to the foregoing description of the embodiment shown in FIG. 16, and only the differences between the embodiments will be described in the following. As shown in FIG. 20, the intermediate portion 62 includes two straight sections 621. The intermediate portion 62 is provided with six through holes 64. Each straight section 621 is provided with three through holes 64. As shown in FIG. 21, the entire intermediate portion 62 includes three arc-shaped sections 622. The intermediate portion 62 is provided with four through holes 64. The plurality of through holes 64 described above are sequentially distributed spaced in the direction from the first connection portion 61 to the second connection portion 63. A direction from the first connection portion 61 to the second connection portion 63 intersects with the arrangement direction X. In some embodiments, the through holes 64 are the same in size and shape, and are evenly distributed between the first connection region 61a and the second connection region 63a. It is easily understood that the amount of the through holes 64 is not limited to four or six as described above. The amount of the through holes 64 may be two, three, five or seven or more according to the product demand.

Figure 22:
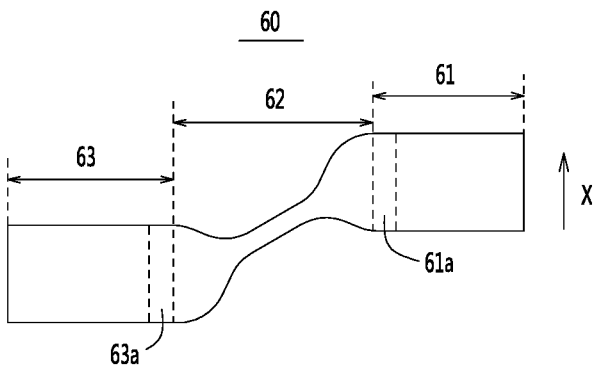
FIG. 22 is a schematic structural view of a sampling leg according to still another embodiment of the application.

In an embodiment, FIG. 22 may be seen as a variation of the embodiment shown in FIG. 5, and therefore, the same portion as those shown in FIG. 5 will not be described again below, which can be understood with reference to the foregoing description of the embodiment shown in FIG. 5, and only the differences between the embodiments will be described in the following. As shown in FIG. 22, the first connection portion 61 and the second connection portion 63 are offset in the arrangement direction X. A cross-sectional area of a part of the intermediate portion 62 is smaller than that of the first connection region 61a and smaller than that of the second connection region 63a, so that the intermediate portion 62 has a relatively small rigidity. Since the first connection portion 61 and the second connection portion 63 are offset from each other, it is advantageous to ensure that the first connection portion 61 and the second connection portion 63 have a relatively large allowable offset in the arrangement direction x. At the same time, since the intermediate portion 62 has good deformability, the buffering ability of the sampling leg 60 is further improved. The widths of both end portions of the intermediate portion 62 in the embodiment are larger than that of the middle region in the arrangement direction X, there is a smooth transition between the end portions and the middle region.

Figure 23:
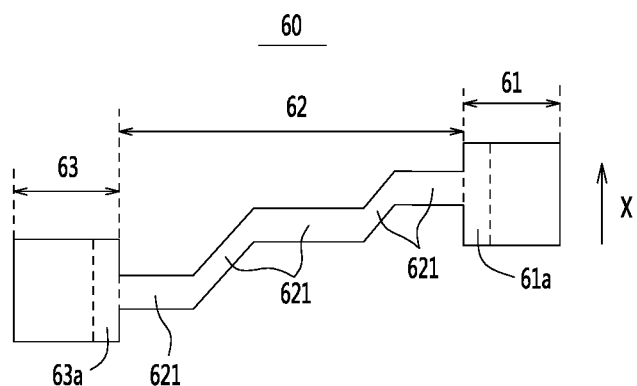
FIG. 23 is a schematic structural view of a sampling leg according to still another embodiment of the application.
Figure 24:
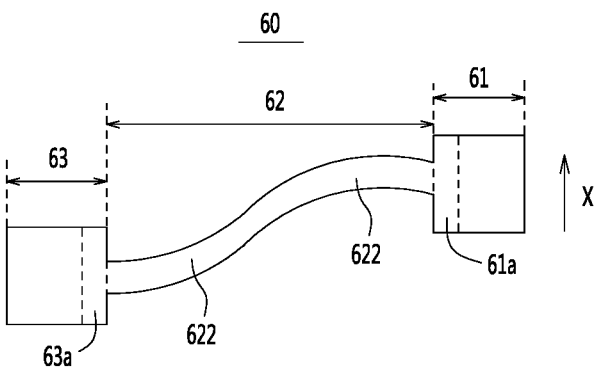
FIG. 24 is a schematic structural view of a sampling leg according to still another embodiment of the application.

In an embodiment, both FIGS. 23 and 24 may be seen as a variation of the embodiment shown in FIG. 22, and therefore, the same portion as those shown in FIG. 22 will not be described again below, which can be understood with reference to the foregoing description of the embodiment shown in FIG. 22, and only the differences between the embodiments will be described in the following. As shown in FIG. 23, the intermediate section includes two or more connection sections successively distributed. The connection sections are straight sections 621. The intermediate portion 62 includes five straight sections 621. Two adjacent straight sections 621 are intersected. Optionally, an angle between two adjacent straight sections 621 may range from 100 degrees to 160 degrees. In some embodiments, the angle between two adjacent straight sections 621 is 135 degrees. As shown in FIG. 24, the connection sections are arc-shaped sections 622. There is a smooth transition between two adjacent arc-shaped sections 622, which is advantageous to reduce stress concentration points. In another example, one part of the at least two connection sections is a straight section 621 and the other part is an arc-shaped section 622. There is a smooth transition between the straight section 621 and arc-shaped section 622.

Figure 25:
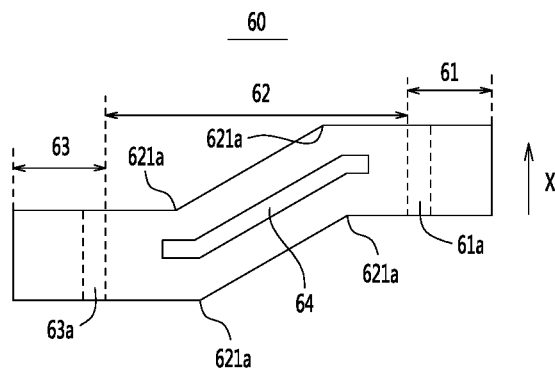
FIG. 25 is a schematic structural view of a sampling leg according to still another embodiment of the application.
Figure 26:
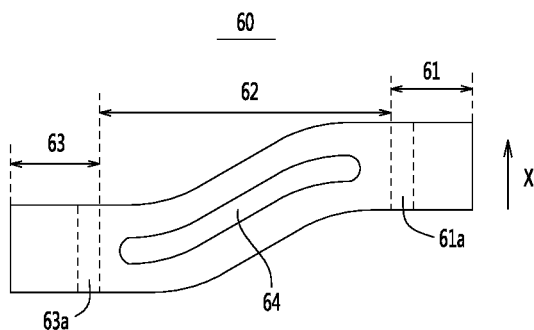
FIG. 26 is a schematic structural view of a sampling leg according to still another embodiment of the application.
Figure 27:
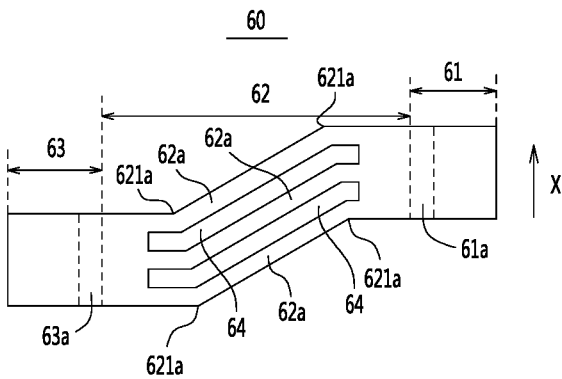
FIG. 27 is a schematic structural view of a sampling leg according to still another embodiment of the application.
Figure 28:
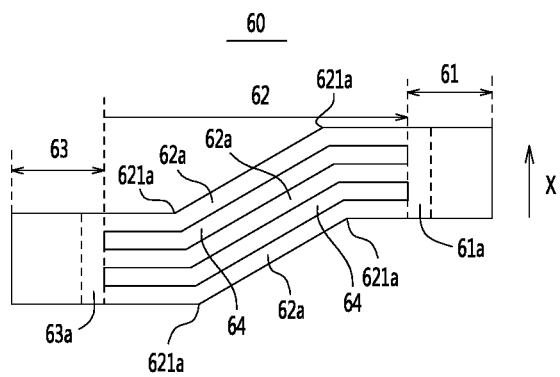
FIG. 28 is a schematic structural view of a sampling leg according to still another embodiment of the application.
Figure 29:
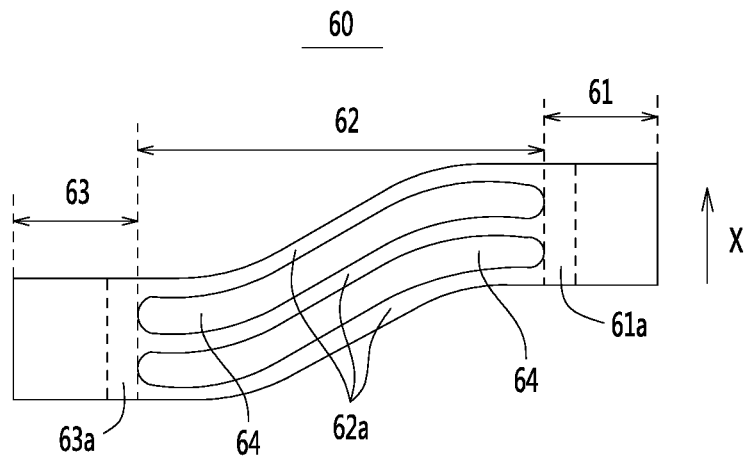
FIG. 29 is a schematic structural view of a sampling leg according to still another embodiment of the application.

In an embodiment, each of FIGS. 25 to 29 may be seen as a variation of the embodiment shown in FIG. 22, and therefore, the same portion as those shown in FIG. 22 will not be described again below, which can be understood with reference to the foregoing description of the embodiment shown in FIG. 22, and only the differences between the embodiments will be described in the following. As shown in FIG. 25, the sampling leg 60 includes a through hole 64. The intermediate portion 62 is provided with the through hole 64. A cross-sectional area of a portion of the intermediate portion 62 corresponding to the through hole 64 is smaller than that of the first connection region 61a and smaller than that of the second connection region 63a, which is advantageous to reduce overall rigidity of the intermediate portion 62. In the embodiment, there is provided with one through hole 64. The through hole 64 extends between the first connection region 61a and the second connection region 63a. The starting point of the through hole 64 is close to the first connection region 61a and has a predetermined distance from the first connection region 61a, and the end point is close to the second connection region 63a and has a predetermined distance from the second connection region 63a. In an example, as shown in FIG. 25, the intermediate portion 62 includes three straight sections 621. Optionally, an angle between two adjacent straight sections 621 may range from 100 degrees to 160 degrees. In some embodiments, the angle between two adjacent straight sections 621 is 135 degrees. The through holes 64 extends continuously over the three straight sections 621. The intermediate portion 62 includes a bent pointed region 621a protruding in the arrangement direction X. The starting point and/or the end point of the through hole 64 is offset from the bent pointed region 621a in the direction from the first connection portion 61 to the second connection portion 63, so as to avoid the bent pointed region 621a and reduce the possibility that the intermediate portion 62 is easily broken at the bent pointed region 621a due to a stress concentrated in the bent pointed region 621a. Optionally, the amount of the straight sections 621 is not limited to three, and may be four or more. In another example, as shown in FIG. 26, the intermediate portion 62 includes three arc-shaped sections 622. The two adjacent arc-shaped sections 622 are connected by a smooth transition. In another example, as shown in FIGS. 27 to 29, the intermediate portion 62 includes two through holes 64. The two through holes 64 are spaced apart in the arrangement direction X to form three strip-like bodies 62a in the intermediate portion 62. The three strip-like bodies 62a may be of redundant design. It is easily understood that the amount of the through holes 64 is not limited to two as described above. The amount of the through holes 64 may be three or more according to the product demand in order to form four or more strip-like bodies 62a at the intermediate portion 62. As shown in FIGS. 27 and 28, the intermediate portion 62 includes three straight sections 621. The starting points of the through holes 64 coincide with the edge of the first connection region 61a close to the second connection region 63a, and the end points coincide with the edge of the second contact region 63a close to the first connection region 61a. As shown in FIG. 29, the intermediate portion 62 includes two arc-shaped sections 622 and a straight section 621 disposed between the arc-shaped sections 622. There are smooth transitions between the arc-shaped sections 622 and the straight section 621, which is advantageous to reduce stress concentration regions. The starting points of the through holes 64 coincide with the edge of the first connection region 61a close to the second connection region 63a, and the end points coincide with the edge of the second contact region 63a close to the first connection region 61a. In other examples, the intermediate portion 62 includes two arc-shaped sections 622. The two arc-shaped sections 622 are connected by a smooth transition.

Figure 30:
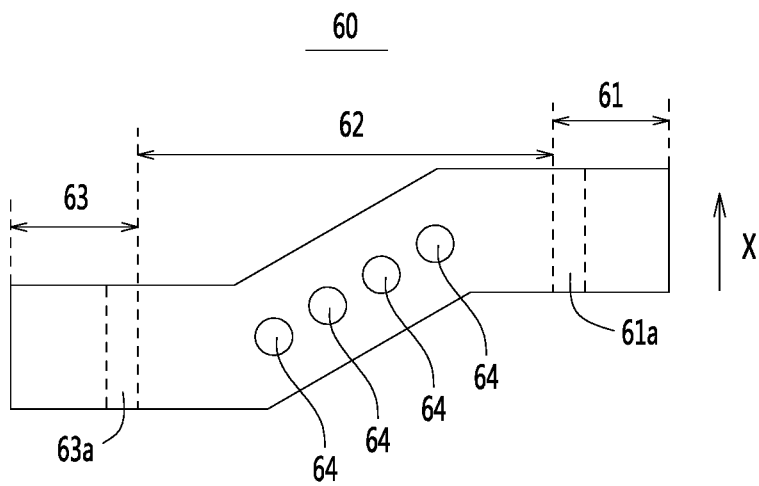
FIG. 30 is a schematic structural view of a sampling leg according to still another embodiment of the application.
Figure 31:
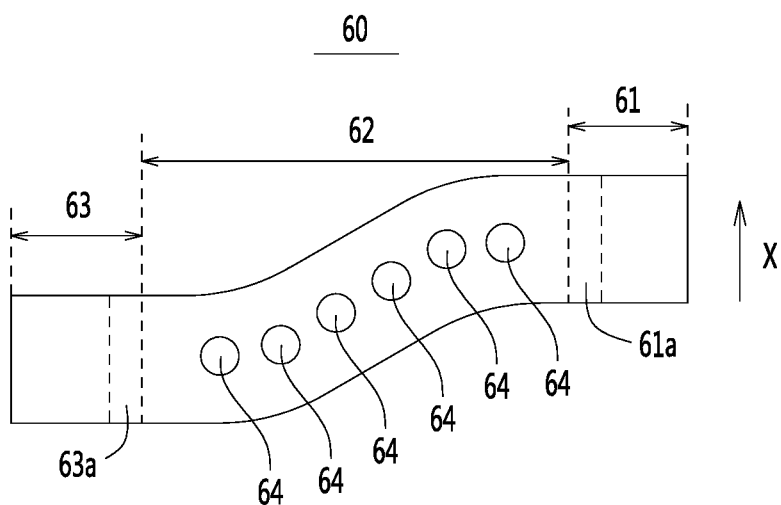
FIG. 31 is a schematic structural view of a sampling leg according to still another embodiment of the application.

In an embodiment, both FIGS. 30 and 31 may be seen as a variation of the embodiment shown in FIG. 25, and therefore, the same portion as those shown in FIG. 25 will not be described again below, which can be understood with reference to the foregoing description of the embodiment shown in FIG. 25, and only the differences between the embodiments will be described in the following. As shown in FIG. 30, the intermediate portion 62 includes three straight sections 621. The intermediate portion 62 is provided with four through holes 64. As shown in FIG. 31, the intermediate portion 62 includes two arc-shaped sections 622 and a straight section 621 disposed between the arc-shaped sections 622. The intermediate portion 62 is provided with six through holes 64. Each of the through holes 64 described above is sequentially distributed spaced in the direction from the first connection portion 61 to the second connection portion 63. A direction from the first connection portion 61 to the second connection portion 63 intersects with the arrangement direction X. In some embodiments, the through holes 64 are the same in size and shape, and are evenly distributed between the first connection region 61a and the second connection region 63a. The shape of the through hole 64 is circular. It is easily understood that the amount of the through holes 64 is not limited to four or six as described above. The amount of the through holes 64 may be two, three, five or seven or more according to the product demand.

The material of the sampling leg 60 of the above embodiments may be a conductive metal such as nickel or copper. In some embodiments, the sampling leg 60 is a nickel sheet.

Figure 32:
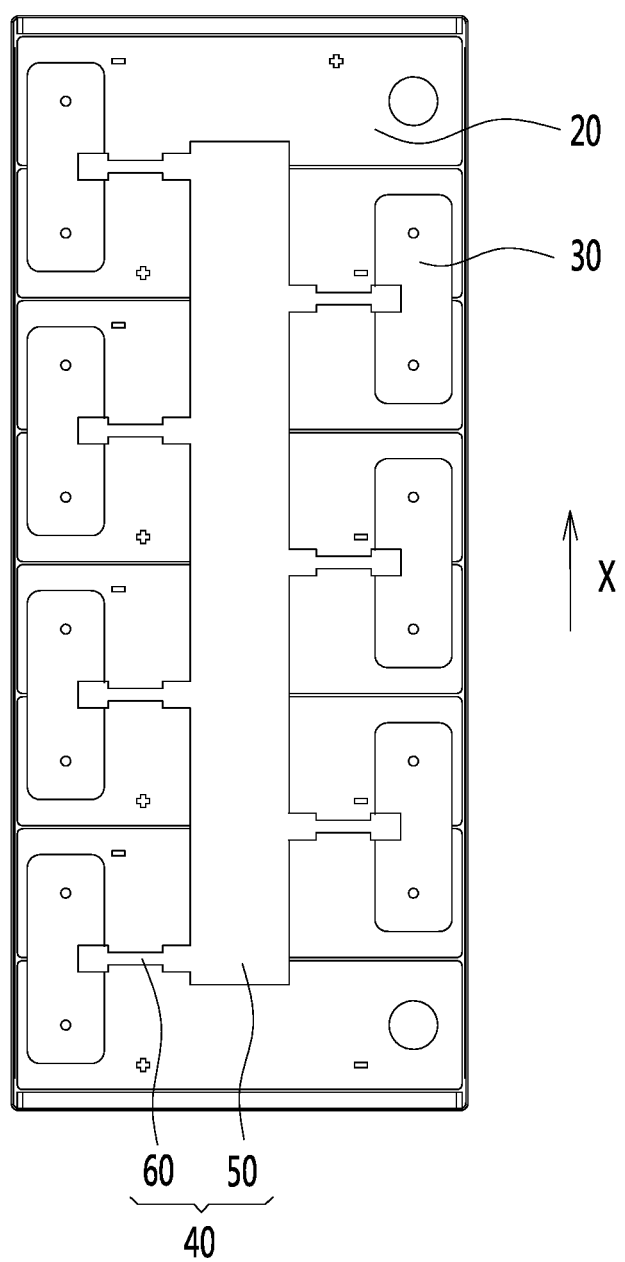
FIG. 32 is a structural top view of a battery module according to still another embodiment of the application.

In an embodiment, as shown in FIG. 32, that sampling leg 60 and the sampling line are of an integrally formed structure. The first connection portion 61 of the sampling leg 60 is integrally formed with the sampling line. The material of both the sampling line and the sampling leg 60 is copper.

In the embodiments of the application, the structure of the sampling leg 60 is optimized, so that the intermediate portion 62 of the sampling leg 60 has better deformability and buffering ability than the first connection portion 61 and the second connection portion 63, which is advantageous to reduce the possibility that the sampling leg 60 bears a tensile force due to a position change of the first connection portion 61 and the second connection portion 63 causing the sampling leg 60 to break under the excessive tensile force, and to ensure that the sampling assembly 40 performs collection normally.

An embodiment of the application further provides a vehicle. The vehicle includes a power source and battery modules 10 according to the above embodiments. The power source is used to provide driving force to the vehicle. A plurality of battery modules 10 can be installed inside the vehicle. The battery modules 10 can supply electric energy to the power source.

Although the application has been described with reference to preferred embodiments, it is possible to make various improvements of it and substitute components therein with equivalents without departing from the scope of the application, and in particular, the various technical features mentioned in various embodiments can be combined in any way. The application is not limited to the specific embodiments disclosed herein, but includes all the technical solutions which fall into the scope of the claims.

What is claimed is:

1. A sampling assembly for a battery module, the battery module comprising a busbar, wherein the sampling assembly comprises:
    a sampling circuit board with a predetermined length and a predetermined width;
    a sampling leg comprising a first connection portion, an intermediate portion and a second connection portion, the first connection portion being connected to the sampling circuit board, the second connection portion configured to be connected to the busbar, the first connection portion comprising a first connection region connected to the intermediate portion, the second connection portion comprising a second connection region connected to the intermediate portion, at least a part of the intermediate portion having a cross-sectional area which is smaller than a cross-sectional area of the first connection region and smaller than a cross-sectional area of the second connection region;
    wherein the first connection portion, the intermediate portion, and the second connection portion are successively distributed in a width direction of the sampling circuit board;
    wherein a length direction of the sampling circuit board intersects with the width direction of the sampling circuit board;
    wherein the intermediate portion is provided with a through hole, a cross-sectional area of a portion of the intermediate portion corresponding to the through hole being smaller than the cross-sectional area of the first connection region and smaller than the cross-sectional area of the second connection region;
    wherein the intermediate portion comprises a bent pointed region protruding in the length direction of the sampling circuit board, a starting point and/or an end point of the through hole being offset from the bent pointed region in the width direction of the sampling circuit board;

wherein the starting point of the through hole is closer to the first connection region than the end point and has a predetermined distance from the first connection region, and the end point is closer to the second connection region than the starting point and has a predetermined distance from the second connection region;

wherein the through hole extends between the first connection portion and the second connection portion in an extension direction of the intermediate portion, such that the through hole has a bent pointed hole region aligned with the bent pointed region of the intermediate portion, and separates the intermediate portion to form a plurality of strip-like bodies extending in the extension direction of the intermediate portion;

wherein a number of the through hole is one in order to form two strip-like bodies separated at the intermediate portion.

2. The sampling assembly according to claim 1, wherein each of the strip-like bodies has an identical cross-sectional area.

3. The sampling assembly according to claim 1, wherein the through hole penetrates through the intermediate portion in the width direction, and the through hole extends from the first connection region to the second connection region.

4. The sampling assembly according to claim 1, wherein a size of the intermediate portion is smaller than a size of the first connection region and smaller than a size of the second connection region in the length direction of the sampling circuit board.

5. The sampling assembly according to claim 1, wherein the first connection portion and the second connection portion are aligned in the length direction of the sampling circuit board; or the first connection portion and the second connection portion are offset from each other in the length direction of the sampling circuit board.

6. The sampling assembly according to claim 1, wherein at least a part of the intermediate portion protrudes from the first connection portion and the second connection portion in the length direction of the sampling circuit board.

7. The sampling assembly according to claim 1, wherein the intermediate portion comprises at least two connection sections successively distributed, which are configured as a wave-shaped structure.

8. The sampling assembly according to claim 7, wherein all of the connection sections are straight sections or arc sections, or each of a part of the at least two connection sections is a straight section, and each of a remaining part of the at least two connection sections is an arc section.

9. The sampling assembly according to claim 1, wherein the sampling leg is a sheet-like structure, a thickness of the first connection portion, a thickness of the intermediate portion, and a thickness of the second connection portion being equal.

10. The sampling assembly according to claim 1, wherein the sampling circuit board comprises a substrate, a sampling line and a protective film, the sampling line being laid on the substrate, the first connection portion of the sampling leg being connected to the sampling line, and at least a part of the first connection portion being covered by the protective film.

11. A connection assembly for a battery module, wherein the connection assembly comprises:

a busbar, an insulator, and a sampling assembly according to claim 1, the busbar and the sampling assembly being connected fixedly by the insulator, the sampling leg extending from the sampling circuit board toward the busbar, and the second connection portion being connected to the busbar.

12. A battery module, wherein the battery module comprises:

secondary batteries, in which two or more secondary batteries are arranged side by side in an arrangement direction;

a busbar arranged on a top of the secondary batteries and electrically connected to at least two of the secondary batteries;

the sampling assembly according to claim 1, the sampling circuit board extending in the arrangement direction and having a stripe-like structure, the sampling leg extending from the sampling circuit board toward the busbar, and the second connection portion being connected to the busbar.

13. The battery module according to claim 12, wherein each of the secondary batteries comprises an electrode assembly comprising wide sides and narrow sides which are alternately distributed, the wide sides intersecting with the arrangement direction.

14. A vehicle, wherein the vehicle comprises:

a power source for providing driving force to the vehicle;

the battery module according to claim 12 configured to supply electric energy to the power source.

* * * * *